United States Patent [19]
Akashi

[11] Patent Number: 5,658,686
[45] Date of Patent: Aug. 19, 1997

[54] GEL ELECTROLYTE AND CELL USING SAME

[75] Inventor: Hiroyuki Akashi, Kanagawa, Japan

[73] Assignee: Sony Corporation, Tokyo, Japan

[21] Appl. No.: 592,189

[22] Filed: Jan. 26, 1996

[30] Foreign Application Priority Data

Jan. 26, 1995 [JP] Japan .................................. 7-011051
May 9, 1995 [JP] Japan .................................. 7-110717

[51] Int. Cl.$^6$ ........................................................ H01M 6/14
[52] U.S. Cl. ........................ 429/190; 429/192; 429/194; 429/122; 429/218; 252/62.2
[58] Field of Search ......................... 429/190, 192, 429/194, 122, 218; 252/62.2

[56] References Cited

U.S. PATENT DOCUMENTS

| | | | |
|---|---|---|---|
| 4,994,335 | 2/1991 | Kamaei et al. | 429/254 |
| 5,219,679 | 6/1993 | Abraham et al. | 429/192 |
| 5,223,353 | 6/1993 | Ohsawa et al. | 429/192 |
| 5,240,790 | 8/1993 | Chua et al. | 429/190 |
| 5,340,672 | 8/1994 | Kubota et al. | 429/192 |
| 5,478,674 | 12/1995 | Miyasaka | 429/218 |
| 5,523,179 | 6/1996 | Chu | 429/192 |
| 5,580,680 | 12/1996 | Chaloner-Gill et al. | 429/192 |

OTHER PUBLICATIONS

Patent Abstract of Japan, vol. 17, No. 137 (E–1335), 22 Mar. 1993, Publication No. JP4306560, Patent No. A 4306560.
Patent Abstract of Japan, vol. 18, No. 290 (E–1557), 2 Jun. 1994, Publication No. JP6060907, Patent No. A 6060907.
Patent Abstract of Japan, vol. 12, No. 80 (E–590), 12 Mar. 1988, Publication No. JP62219469, Patent No. A 62219469.
Patent Abstract of Japan, vol. 12, No. 168 (E–611), 20 May 1988, Publication No. JP62278774, Patent No. A 62278774.
Journal of the Electrochemical Society, vol. 139, No. 7, Jul. 1992, Gel Electrolyte for Solid–State Electrochromic Cell, O. Bohnke et al, pp. 1862–1865.
Electrochimica Acta, vol. 39, No. 14, Oct. 1994, Synthesis and Characterization of Highly Conducting Gel Electrolytes, F. Croce et al, pp. 2187–2194.

Primary Examiner—Bruce F. Bell
Attorney, Agent, or Firm—Hill, Steadman & Simpson

[57] ABSTRACT

A fire-retardant gel electrolyte comprising a gelled solution composed of a non-aqueous solvent and a salt of an electrolyte dissolved in the non-aqueous solvent, the gel electrolyte having an ionic conductivity of 1 mS/cm at a temperature of 25° C. In addition, in accordance with the present invention, there is also provided a cell comprising a fire-retardant gel electrolyte having an ionic conductivity of 1 mS/cm or greater at a temperature of 25° C., and positive and negative electrodes.

11 Claims, 4 Drawing Sheets

| | ACRYLONITRILE MONOMER (mol%) | EC (mol%) | PC (mol%) |
|---|---|---|---|
| A | 30 | 20 | 50 |
| B | 5 | 20 | 75 |
| C | 5 | 85 | 10 |
| D | 30 | 60 | 10 |

|   | ACRYLONITRILE MONOMER (mol%) | EC (mol%) | PC (mol%) |
|---|---|---|---|
| A | 30 | 20 | 50 |
| B | 5  | 20 | 75 |
| C | 5  | 85 | 10 |
| D | 30 | 60 | 10 |

GEL ELECTROLYTE AND CELL USING SAME

BACKGROUND OF THE INVENTION

1. Field of the Invention:

This invention relates to a fire-retardant gel electrolyte which can be employed in a lithium-type secondary cell or the like instead of a non-aqueous electrolyte solution and a cell using the fire-retardant gel electrolyte.

2. Prior Art:

Recently, an intense attention has been paid to a lithium secondary cell which is composed of a positive electrode made of a lithium-containing compound, a negative electrode made of a material such as lithium, a lithium alloy and a carbonaceous material capable of occluding lithium, and a non-aqueous electrolyte solution composed of a non-aqueous solvent and a salt of an electrolyte dissolved in the non-aqueous solvent, because the lithium secondary cell exhibits a relatively large electromotive force (output) and a relatively high energy density as compared with aqueous electrolyte solution-type secondary cells such as a lead cell, a nickel-cadmium cell or the like.

In order to further improve a performance of such a lithium secondary cell, it is important to take into account a property of the electrolyte which gives an influence on an ionic conductivity between the positive and negative electrodes, in addition to selection of materials used for the negative positive electrodes. As a consequence, a variety of proposals concerning non-aqueous solvents and electrolyte salts has been made to obtain an electrolyte having a high ionic conductivity and an enhanced resistance to a high voltage.

For example, the non-aqueous solvent used conventionally includes a carbonate-series solvent such as propylene carbonate, ethylene carbonate, methyl-ethyl carbonate and dimethyl carbonate, γ-butyl lactone, 1, 2-dimethoxy ethane, methyl propionate, butyl propionate and the like.

Further, the electrolyte salt reported and used conventionally includes $LiPF_6$, $LiClO_4$, $LiBF_4$, $LiCF_3SO_3$, $LiAsF_6$, $LiN(CF_3SO_2)_2$, $LiC(CF_2SO_2)_3$, or the like.

However, the non-aqueous electrolyte solution composed of the non-aqueous solvent and the electrolyte salt enumerated above has a relatively small heat capacity, as described in Japanese patent laid-open publication No. 184870/92. As a result, in the event that the cell is accidentally placed in the flame, the solvent is caused to be evaporated in association with an increase of the ambient temperature, so that there is a risk that the solvent vapor fires.

One measure for preventing the above-mentioned problem has been proposed in Japanese patent laid-open publication No. 184870/92 in which a fire-retardant phosphoric acid ester is added to the electrolyte solution to eliminate the possible firing.

However, an organic ester compound such as phosphoric acid ester has such a problem that an electrochemical resistance to an oxidation/reduction reaction is relatively small. If such phosphoric acid ester is applied to a lithium secondary cell having an advantageously high terminal voltage, for example, 4 volts or higher, phosphoric acid ester is subjected to an undesired oxidation/reduction reaction in association with repeated charging and discharging cycles, which results in deterioration of a discharging capacity of the cell.

OBJECT AND SUMMARY OF THE INVENTION

It is therefore an object of the present invention to provide a gel electrolyte suitably applicable as an electrolyte material for a cell and having an excellent fire-retardant property and an enhanced electrochemical resistance to an oxidation/reduction reaction.

Further, it is another object of the present invention to provide a cell exhibiting an excellent discharge capacity, in which the above-mentioned fire-retardant gel electrolyte is used.

In order to accomplish the above-mentioned objects, in accordance with one aspect of the present invention, there is provided a fire-retardant gel electrolyte comprising a gelled solution composed of a non-aqueous solvent and an electrolyte salt dissolved in the non-aqueous solvent, the gel electrolyte having an ionic conductivity of 1 mS/cm or greater at a temperature of 25° C.

Further, in accordance with another aspect of the present invention, there is provided a cell comprising a fire-retardant gel electrolyte having an ionic conductivity of 1 mS/cm or greater at a temperature of 25° C., and positive and negative electrodes.

It has been found that, when a non-aqueous electrolyte solution having a particular composition is gelled by using, for example, a polymer having a side chain to which a nitrile group is bonded, a fire-retardant gel electrolyte having as high an ionic conductivity as 1 mS/cm or greater at a temperature of 25° C. can be obtained.

The fire-retardant gel electrolyte obtained according to the present invention has an ionic conductivity of 1 mS/cm or greater and does not contain the material exhibiting a deteriorated resistance to an oxidation/reduction reaction, such as phosphoric acid ester, so that such a fire-retardant gel electrolyte is suitably employed as an electrolyte material for a cell. Specifically, when the gel electrolyte is applied to the production of the cell, the resultant cell exhibits an excellent fire-retardant property by which a possible firing accident can be eliminated even when the cell is placed in the flame, so that a cell having a high safety can be obtained. In addition, when the gel electrolyte is used as an electrolyte material for a cell, any leakage of the gel electrolyte from the cell is eliminated even when handled roughly, so that a contamination of devices to which the cell is mounted can be prevented.

DETAILED DESCRIPTION OF THE INVENTION

Figures 1A, 1B:
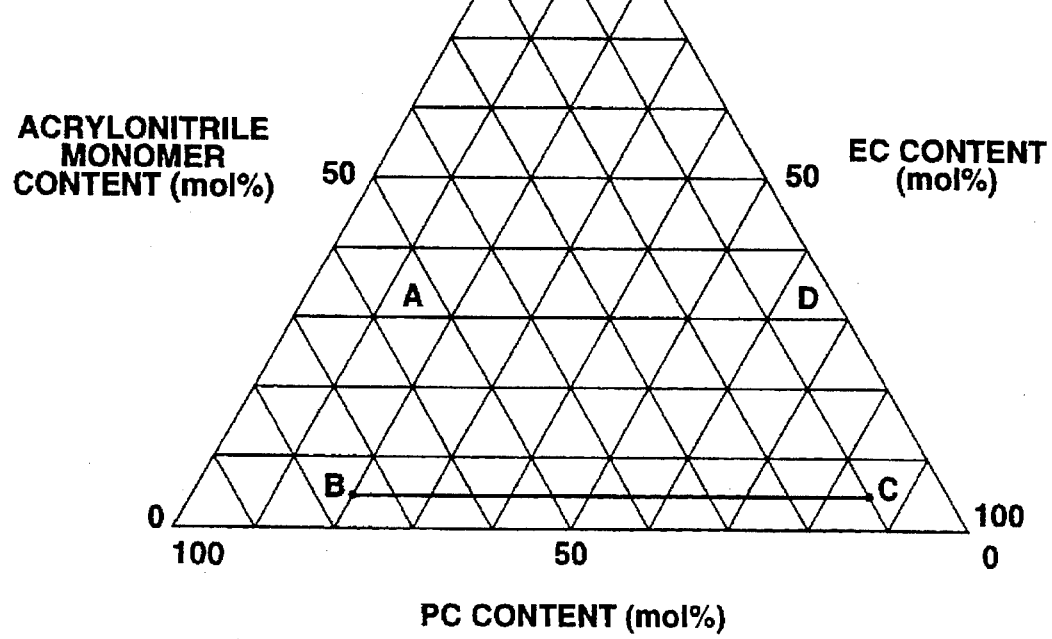
FIG. 1A is a table defining the composition ranges illustrated in the ternary composition diagram shown in FIG. 1B.
FIG. 1B is a ternary composition diagram showing a preferred range for a fire-retardant gel electrolyte according to the present invention.

The present invention is basically concerned with a fire-retardant gel electrolyte which is produced by gelling a non-aqueous electrolyte solution having a particular composition by using a polymer, for example, those having a side chain to which at least one nitrile group is bonded, and a cell produced by using such a fire-retardant gel electrolyte. The fire-retardant gel electrolyte obtained can exhibit an ionic conductivity as high as 1 mS/cm or greater at a temperature of 25° C.

As mentioned above, such a fire-retardant gel electrolyte has an ionic conductivity of 1 mS/cm or greater and does not contain a material causing the deterioration in a resistance to an oxidation/reduction reaction, so that it is possible to employ the fire-retardant gel electrolyte as an electrolyte material for the production of a cell. When the fire-retardant gel electrolyte is used as the electrolyte material for the production of cells, the resultant cell can exhibit an excellent fire-retardant property and an enhanced safety whereby possible firing of the cell is effectively prevented, for example, even when it is accidentally placed in the flame. In addition, no leakage of the gel electrolyte occurs even when handled roughly so that the contamination of devices to which the cell is mounted is effectively prohibited.

In the production of such a fire-retardant gel electrolyte, an electrolyte solution having the particular composition can be converted to a gel state by using a gelling agent, for example, a polymer having a side chain to which at least one nitrile group is bonded.

Specifically, when the electrolyte solution is gelled by the polymer having a side chain to which at least one nitrile group is bonded, a non-aqueous electrolyte solution composed of a predetermined amount of a electrolyte salt and a non-aqueous solvent is preliminarily prepared. After heating, a gelling agent, namely the polymer having a side chain to which at least one nitrile group is bonded, is added to the non-aqueous electrolyte solution. The addition of the gelling agent causes an increase in viscosity of the non-aqueous electrolyte solution. After completely dissolving the gelling agent in the non-aqueous electrolyte solution, the resultant gel solution is immediately stretched over a substrate and then gradually cooled to obtain the fire-retardant gel electrolyte.

The gelling agent, namely the polymer having a side chain to which at least one nitrile group is bonded, is preferably polyacrylonitrile in view of its gelling state and fire retardant property. Further, the gelling agent may be in the form of a copolymer which is obtained by copolymerizing a mixture containing an acrylonitrile monomer and other monomers in an appropriate proportion. Examples of such an acrylonitrile-series copolymer may include an acrylonitrile-butadiene rubber, an acrylonitrile-butadiene-stylene resin, an acrylonitrile-polyethylene chloride-stylene resin, an acrylonitrile-stylene resin, an acrylonitrile-ethylene-propylene-diene-stylene resin, an acrylonitrile-vinyl chloride resin, an acrylonitrile-methacrylate resin, or the like.

Here, it should be noted that a degree of the gelation of the non-aqueous electrolyte solution is determined by a molecular weight of the polyacrylonitrile and the acrylonitrile-series copolymer used as the gelling agent. Accordingly, it is necessary that each of the polyacrylonitrile and the acrylonitrile-series copolymer has such a molecular weight that a sufficient gelation is caused thereby. However, when the molecular weight of the gelling agent is extremely large, the viscosity of the non-aqueous electrolyte solution is too high when added, so that the film formation or stretching of the gel electrolyte on the substrate becomes difficult. In view of easiness of the film formation, it is preferred that the polyacrylonitrile or the acrylonitrile-series copolymer has a number-average molecular weight raging from about 50,000 to about 500,000.

The non-aqueous solvent and the electrolyte salt used for the production of the gel electrolyte may be those generally used for the production of a lithium secondary cell.

Examples of the suitable non-aqueous solvent may include those having an electric potential window ranging from −0.3 V to 4.9 V relative to an electric potential of lithium. Particularly, ethylene carbonate (EC), propylene carbonate (PC), γ-butyl lactone or the like is preferable because an electric potential window of those compounds is fallen within the above mentioned range and can impart a high ionic conductivity to the gel electrolyte. Incidentally, these non-aqueous solvents are used singly or in the form of a mixture of a plurality of compounds. A particularly preferable example of the non-aqueous solvent for the gel electrolyte is a mixture containing ethylene carbonate (EC) and propylene carbonate (PC) in combination.

One of preferred examples of the electrolyte salt may include $LiPF_6$ because it exhibits an excellent ionic conductivity and can impart a high fire-retardant property to the resultant gel product. Although $LiPF_6$ may be combined with the other lithium salt, it is preferred that $LiPF_6$ is used singly.

Incidentally, the optimum proportions of these materials used are determined by taking into account easiness of the film formation and a degree of the gelation in addition to the ionic conductivity and the fire-retardant property. Concretely, when the polyacrylonitrile is used as the gelling agent, a molar ratio of a monomer as a repeating unit of the polyacrylonitrile to the non-aqueous solvent is suitably in the range of 5:95 to 30:70 though it varies depending upon kinds of the non-aqueous solvent, the gelling agent and the electrolyte salt used therein.

Particularly, when polyacrylonitrile is used as the gelling agent and a mixture of ethylene carbonate (EC) and propylene carbonate (PC) is used as the non-aqueous solvent, it is preferred that the ratio between the monomer as the repeating unit of polyacrylonitrile, ethylene carbonate (EC) and propylene carbonate (PC) is fallen within a region surrounded by the lines between four sites A, B, C and D of a ternary composition diagram as shown in FIGS. 1A and 1B.

When the proportion of acrylonitrile monomer is smaller than those of the region, the gelation of the non-aqueous electrolyte solution cannot proceed satisfactorily so that a gel electrolyte having a good quality cannot be obtained. On the other hand, when the proportion of acrylonitrile is greater than those values of the region, there is a tendency that a good film formation of the resultant gel electrolyte cannot be achieved. Meanwhile, since the ionic conductivity of the gel electrolyte varies depending upon an amount of polyacrylonitrile added, the ionic conductivity of the fire-retardant gel electrolyte can be adjusted to an optimum value by controlling the proportion of polyacrylonitrile to be added to the mixture of the non-aqueous solvent and the electrolyte salt. By this measure, it is possible to impart to the fire-retardant gel electrolyte a good ionic conductivity which cannot be obtained by the use of the non-aqueous electrolyte solution only. For instance, the production of a cell having a high resistance to an elevated temperature can be realized.

Further, when the electrolyte salt is $LiPF_6$, the lithium salt may be suitably used in a concentration of 0.4 to 2M, namely 0.4 to 2 moles per one liter of the non-aqueous solvent. When the concentration of the electrolyte salt to the non-aqueous solvent is lower than 0.4M, an ionic conductivity of the gel electrolyte is insufficient. On the other hand, when the concentration of the electrolyte salt to the non-aqueous solvent is higher than 2M, the electrolyte salt is difficult to be dissolved in the non-aqueous solvent. Further, a viscosity of the gel electrolyte as a whole increases so that an ionic conductivity of the gel electrolyte is extremely lowered.

Incidentally, electrolyte materials using the polymer having a side chain to which a nitrile group is bonded have been also proposed in Japanese patent laid-open publication No. 253316/92, Japanese patent laid-open publication No. 271774/94 and Japanese patent laid-open publication No. 279647/94.

However, the electrolyte material disclosed in Japanese patent laid-open publication No. 253316/92, is made of a solid polymer membrane composed primarily of polyacrylonitrile in which lithium ions are contained. This electrolyte material has been suggested to be used particularly as a material for a capacitor. Therefore, the electrolyte material is designed to achieve an improvement in an impedance frequency characteristic thereof. Accordingly, there is no concrete description with respect to improvement in a fire-retardant property and an ionic conductivity of the electrolyte material. The feature of the electrolyte material disclosed in Japanese patent laid-open publication No. 253316/92 rather resides in obtaining a low ionic conductive material.

Further, the electrolyte materials disclosed in Japanese patent laid-open publications Nos. 271774/94 and 279647/94 are composed only of the polymer having a side chain to which a nitrile group is bonded and an salt of alkali metal. As a result, the electrolyte materials disclosed therein are a completely-solid state electrolyte which is not impregnated with any non-aqueous solvent. It is contemplated that the electrolyte material is applied to an electrolyte for a cell to improve its ionic conductivity. However, the ionic conductivity thereof is in a low level, namely merely in the range of $10^{-6}$ to $10^{-5}$ S/cm which is not satisfactorily large.

To the contrary, as mentioned above, the fire-retardant gel electrolyte proposed by the present invention is obtained by gelling a non-aqueous electrolyte solution composed of an non-aqueous solvent and an electrolyte salt by using a gelling agent, for example a polymer having a side chain to which at least one nitrile group is bonded. The gel electrolyte can exhibit a high fire retardant property and an enhanced ionic conductivity of 1 mS/cm or higher. That is, the fire-retardant gel electrolyte according to the present invention is different in constituents thereof from the electrolyte materials disclosed in the above-mentioned three Japanese patent laid-open publications. As a consequence, when applied to the production of a cell, the resultant cell using the fire-retardant gel electrolyte according to the present invention can show an extremely excellent effect or function as compared with those disclosed in the three Japanese patent laid-open publications.

As mentioned above, the thus obtained fire-retardant gel electrolyte can be applied as, for example, an electrolyte material for a cell in a suitable manner. In this case, a cell to which the fire-retardant gel electrolyte according to the present invention is applied may be a primary cell or a secondary cell. When the fire-retardant gel electrolyte is applied to the production of the secondary cell, a positive electrode activating ingredient and a negative electrode activating ingredient used therein may be those enumerated below.

That is, examples of the suitable positive electrode activating ingredient may include a lithium-containing compound, for example, a lithium/transition metal composite oxide represented by a general formula of $Li_xMO_2$ wherein M is at least one transition metal, preferably at least one element selected from the group consisting of Mn, Co and Ni, and x is a number not less than 0.05 but not greater than 1.10.

Whereas, examples of the suitable negative electrode activating ingredient may include metallic lithium, a lithium alloy and a carbonaceous material capable of occluding lithium. Examples of such a carbonaceous material may include pyrolytic carbon, cokes such as pitch cokes, needle cokes and petroleum cokes, graphite, glass-like carbon, a burned product of an organic polymeric compound, which may be obtained by carbonizing and calcining a furan resin or the like at an appropriate temperature, carbon fibers, active carbon, or the like.

EXAMPLES

The present invention is described in more detail by way of examples below.

The fire-retardant gel electrolyte according to the present invention can be obtained by gelling a non-aqueous electrolyte solution, and particularly has a high fire retardant property and an enhanced ionic conductivity of 1 mS/cm or greater at a temperature of 25° C. First, a suitable composition for the fire-retardant gel electrolyte, which can meet the above-mentioned requirements, was investigated as follows.

Study on Proportions of Non-Aqueous Solvent and Gelling Agent

A fire-retardant gel electrolyte was prepared in the following manner.

Polyacrylonitrile, ethylene carbonate (EC) and propylene carbonate (PC) were weighed respectively in such amounts as represented in Tables 1 and 2 below. Of those constituents, ethylene carbonate (EC) and propylene carbonate (PC) serving as components of the non-aqueous solvent were first charged into a beaker while agitating to obtain a mixture thereof. Incidentally, the amount (mixing ratio) of polyacrylonitrile shown in Tables was represented in terms of a molar ratio of a monomer as a repeating unit of polyacrylonitrile. The thus obtained mixture was blended with a $LiPF_6$ solution having a molar concentration of 1.0M and the resultant mixture solution was heated to a temperature of 130° C. After the mixture solution was sufficiently subjected to the heating, polyacrylonitrile as a gelling agent was charged slowly into the mixture solution. After completion of the addition of polyacrylonitrile, the mixture solution was heated for 10 minutes while agitating. As a result, a transparent viscous liquid (gel solution) was obtained. The gel solution was then stretched over a glass dish and cooed at room temperature to obtain the aimed fire-retardant gel electrolyte.

The thus obtained gel electrolyte was subjected to the measurement of ionic conductivities (σ1, σ2) at temperatures of 25° C. and −20° C., respectively. The gel electrolyte was further evaluated with respect to a fire retardant property thereof. Methods and procedures used for the measurement of the ion conductivity and the evaluation of the fire retardant property are described below.

Measurement of Ion Conductivity

The gel electrolyte prepared above was cut into a cylindrical shape having a diameter of 1 cm. The cylindrical gel electrolyte was interposed between a pair of disc-like platinum electrodes each having a diameter of 1 cm. While maintaining this state, an ionic conductivity of the gel electrolyte was measured by using an impedance analyzer. The measurement was performed under an applied voltage of 0.5 mV and a sweep frequency ranging from 5 MHz to 13 MHz.

Figure 2:
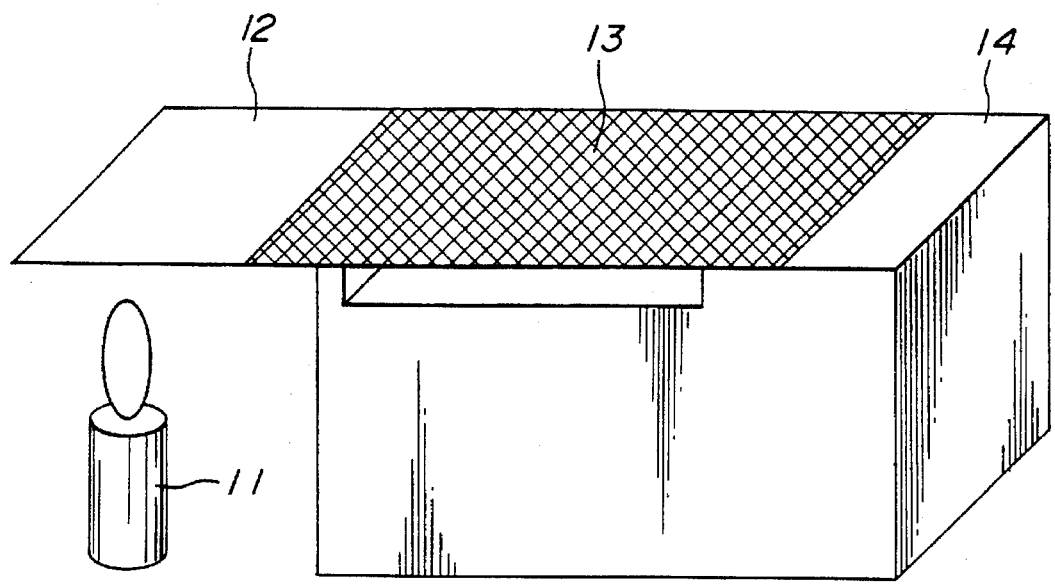
FIG. 2 is a schematic diagram showing a testing procedure for examining a fire-retardant property of a gel electrolyte according to the present invention.

Evaluation of Fire Retardant Property 500 milligrams of the gel electrolyte 13 prepared above was placed on a filter paper 12 having a size of 10 cm×10 cm×0.01 cm, as shown in FIG. 2. The filter paper 12 carrying the gel electrolyte was supported on a supporting block 14 such that an end portion of the filter paper 12 opposite the side where the gel electrolyte was carried, was projected from one end of the supporting block. The projected end portion of the filter paper was directly exposed to a flame of a gas lighter 11 which was placed under the projected portion of the filter paper 12. After the exposure to the flame of the gas lighter 11 was continued for 1 minute, the gas lighter 11 was removed from the position under the filter paper 12. A portion of the filter paper 12 on which the gel electrolyte was carried was observed about whether or not any burned portion existed. In the event that any burned portion was not observed or burning of the portion was self-extinguished, the conditions were recorded as "not burning" in Tables 1 and 2.

The results of the measurement are shown in Tables 1 and 2 along with the mixing ratio of the respective components of the gel electrolyte.

TABLE 1

| Ex. No.[1] | ANM[2] (mol %) | EC[3] (mol %) | PC[4] (mol %) | IC[5] | IC[6] | Burning Test | Others[7] |
|---|---|---|---|---|---|---|---|
| 1 | 5 | 85 | 10 | 4.7 | 0.4 | not burned | — |
| 2 | 20 | 70 | 10 | 3.6 | 0.3 | not burned | — |
| 3 | 25 | 65 | 10 | 2.5 | 0.2 | not burned | — |
| 4 | 5 | 90 | 5 | 4.0 | 0.03 | not burned | — |
| 5 | 20 | 75 | 5 | 3.5 | 0.03 | not burned | — |
| 6 | 25 | 70 | 5 | 2.5 | 0.02 | not burned | — |
| 7 | 5 | 20 | 75 | 3.8 | 0.4 | not burned | — |
| 8 | 20 | 20 | 60 | 3.4 | 0.3 | not burned | — |
| 9 | 25 | 20 | 55 | 2.5 | 0.2 | not burned | — |

Note:
[1]: Experimental Example Number;
[2]: Acrylonitrile monomer;
[3]: Ethylene carbonate;
[4]: Propylene carbonate;
[5]: Ionic conductivity σ1 (mS/cm) measured at 25° C.;
[6]: Ionic conductivity σ2 (mS/cm) measured at −20° C.; and
[7]: Problems occurring upon the gel formation.

TABLE 2

| Ex. No.[1] | ANM[2] (mol %) | EC[3] (mol %) | PC[4] (mol %) | IC[5] | IC[6] | Burning Test | Others[7] |
|---|---|---|---|---|---|---|---|
| 10 | 5 | 10 | 85 | 2.1 | 0.4 | not burned | — |
| 11 | 20 | 10 | 70 | 1.8 | 0.4 | not burned | — |

TABLE 2-continued

| Ex. No.[1] | ANM[2] (mol %) | EC[3] (mol %) | PC[4] (mol %) | IC[5] | IC[6] | Burning Test | Others[7] |
|---|---|---|---|---|---|---|---|
| 12 | 25 | 10 | 65 | 1.1 | 0.2 | not burned | — |
| 13 | 5 | 70 | 25 | 3.8 | 0.4 | not burned | — |
| 14 | 20 | 70 | 10 | 2.59 | 0.4 | not burned | — |
| 15 | 25 | 70 | 5 | 2.2 | 0.03 | not burned | — |
| 16 | 2 | 60 | 38 | — | — | not burned | [8] |
| 17 | 4 | 60 | 36 | — | — | not burned | [9] |
| 18 | 30 | 60 | 10 | 1.4 | 0.1 | not burned | [10] |

Note:
[1]: Experimental Example Number;
[2]: Acrylonitrile monomer;
[3]: Ethylene carbonate;
[4]: Propylene carbonate;
[5]: Ionic conductivity σ1 (mS/cm) measured at 25° C.;
[6]: Ionic conductivity σ2 (mS/cm) measured at −20° C.; and
[7]: Problems occurring upon the gel formation;
[8]: Difficulty in gelation was observed;
[9]: Difficulty in gelation was observed;
[10]: Slight difficulty in film formation was observed.

On the basis of the results of the measurement shown in Tables 1 and 2, the content of polyacrylonitrile in terms of the acrylonitrile monomer was first investigated. In Experimental Examples 16 and 17 in which small contents of the acrylonitrile polymer, namely 2 mole % and 4 mole %, was used, the gelation of the raw mixture solution was unlikely to proceed smoothly so that extreme difficulty was observed upon production of the gel electrolyte and the measurement of the conductivity thereof was impossible. From this results mentioned above, it was confirmed that the content of the acrylonitrile monomer contained in the gel electrolyte was required to be 5 mole % or greater. On the other hand, when the content of the acrylonitrile monomer contained in the gel electrolyte was as high as 30 mole % as in Experimental Example 18, a viscosity of the raw mixture solution upon the gelation step became too high so that a film formation of the gel electrolyte was relatively difficult. Further increased content of the acrylonitrile monomer contained in the gel electrolyte made it more difficult to achieve a good film formation of the gel electrolyte. From this results, it was determined that an upper limit of the content of the acrylonitrile monomer was 30 mole %.

Next, an investigation was made with respect to a content of propylene carbonate (PC). The gel electrolytes of Experimental Examples 4 to 6 each having a propylene carbonate (PC) content of 5 mole %, exhibited a low ionic conductivity σ2 as compared with those of Experimental Examples 1 to 3 each having a propylene carbonate (PC) content of 10 mole %. Particularly, the ionic conductivity of each of the gel electrolytes of Experimental Examples 4 to 6 was extremely low under a low temperature condition, which was about one-tenth of the ionic conductivities obtained from those of Experimental Examples 1 to 3. From the results mentioned above, it was confirmed that the content of propylene carbonate (PC) contained in the gel electrolyte was required to be 10 mole % or greater.

Further investigation was made with respect to a content of ethylene carbonate (EC). The gel electrolytes of Experimental Examples 10 to 12 each having an ethylene carbonate (EC) content of 10 mole %, exhibited a relatively low ionic conductivity under a temperature of 25° C. as compared with those of Experimental Examples 7 to 9 each having an ethylene carbonate (EC) content of 20 mole %. From the results mentioned above, it was confirmed that the content of ethylene carbonate (EC) contained in the gel electrolyte was suitably 20 mole % or greater.

That is, when polyacrylonitrile was used as a gelling agent and a mixture of propylene carbonate (PC) and ethylene carbonate (EC) was used as a non-aqueous solvent, it was confirmed that the contents (mixing ratio) of the respective components were adjusted so as to be fallen within the region surrounded and defined by four sites A, B, C and D of the ternary composition diagram as shown in FIG. 1 so that the gel electrolyte suitable as an electrolyte for a cell was able to be obtained.

Incidentally, in order to ascertain the above-mentioned results, still further investigation was made, in which the gel electrolyte was prepared such that the contents (mixing ratio) of the respective components were optionally selected from those fallen within or out of the region surrounded by the four sites A, B, C and D. The thus prepared gel electrolytes were subjected to the measurements concerning an ionic conductivity and a fire retardant property. The results of the measurement are shown in Table 3.

TABLE 3

| Ex. No.[1] | ANM[2] (mol %) | EC[3] (mol %) | PC[4] (mol %) | IC[5] | IC[6] | Burning Test | Others[7] |
|---|---|---|---|---|---|---|---|
| 19* | 20 | 69 | 11 | 3.8 | 0.3 | not burned | — |
| 20* | 19 | 55 | 26 | 3.0 | 0.3 | not burned | — |
| 21* | 19 | 39 | 41 | 2.9 | 0.3 | not burned | — |
| 22* | 19 | 29 | 52 | 3.1 | 0.3 | not burned | — |
| 23* | 15 | 57 | 28 | 3.0 | 0.4 | not burned | — |
| 24* | 13 | 58 | 29 | 3.0 | 0.3 | not burned | — |
| 25* | 18 | 54 | 27 | 3.1 | 0.4 | not burned | — |
| 26* | 21 | 56 | 21 | 3.0 | 0.3 | not burned | — |
| 27** | 18 | 76 | 7 | 3.5 | 0.01 | not burned | — |
| 28** | 21 | 11 | 68 | 2.0 | 0.3 | not burned | (8) |
| 29** | 18 | 11 | 71 | 2.1 | 0.3 | not burned | (9) |
| 30** | 22 | 0 | 78 | 2.0 | 0.3 | not burned | (10) |

Note:
[1]: Experimental Example Number;
[2]: Acrylonitrile monomer;
[3]: Ethylene carbonate;
[4]: Propylene carbonate;
[5]: Ionic conductivity σ1 (mS/cm) measured at 25° C.;
[6]: Ionic conductivity σ2 (mS/cm) measured at −20° C.; and
[7]: Problems occurring upon the gel formation;
[8]: Difficulty in film formation was observed;
[9]: Difficulty in film formation was observed;
[10]: Difficulty in film formation was observed.
(*): The contents of the respective components used in the Experimental Examples 19 through 26 indicated by (*), were fallen within the region surrounded by the points A, B, C and D of the ternary composition diagram as shown in FIG. 1.
(): The contents of the respective components used in the Experimental Examples 27 through 30 indicated by (), were fallen out of the region surrounded by the points A, B, C and D of the ternary composition diagram as shown in FIG. 1.

As understood from the above-mentioned results, it was confirmed that the gel electrolytes, in which the contents of the respective components were fallen within the above-mentioned region of the ternary composition diagram, exhibited a high ionic conductivity and an enhanced fire retardant property. On the other hand, the gel electrolytes in which the content of the respective components were fallen out of the above-mentioned region, showed deficiencies such as difficulty in the film formation and lowering of the ionic conductivity. From the results mentioned above, it was ascertained that, when the contents of the respective components were fallen within the region surrounded by the four sites A, B, C and D of the ternary composition diagram, the suitable gel electrolytes were obtained.

Study on Salt of Electrolyte

Figure 4:
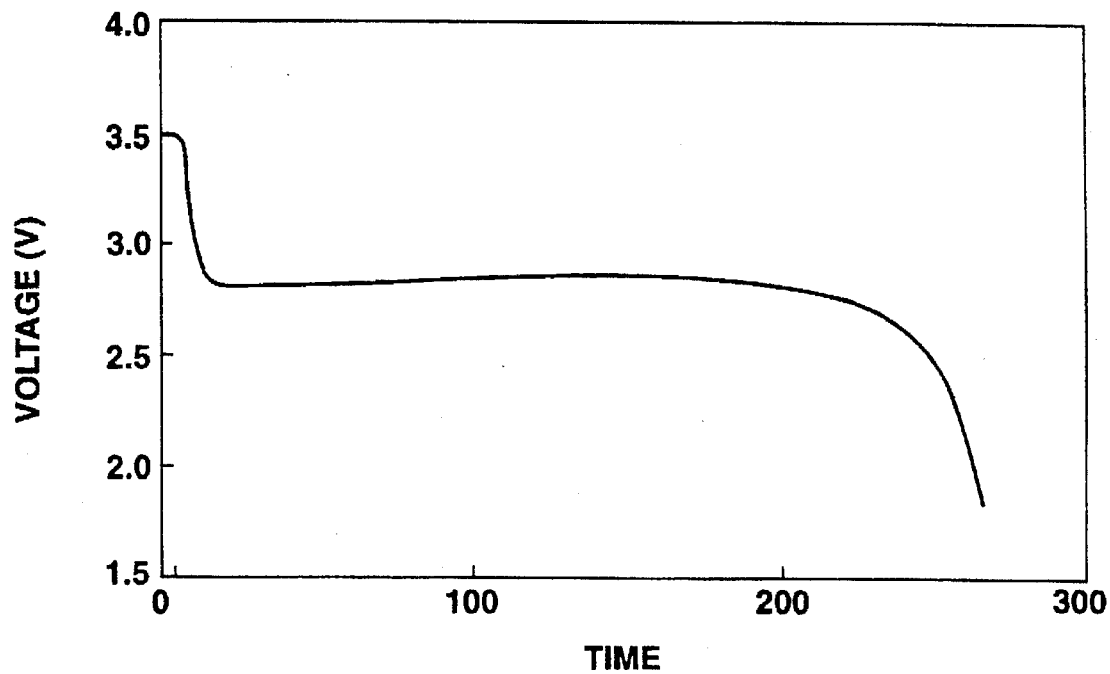
FIG. 4 is a graph showing a characteristic curve of a discharging property of a primary cell to which the fire-retardant gel electrolyte according to the present invention is applied.

The gel electrolyte was prepared in the same manner as described above except that the contents of the respective components were fixed such that the ratio of the acrylonitrile monomer: ethylene carbonate (EC): propylene carbonate (PC) was 20 mole %: 60 mole %: 20 mole %, and the lithium salts shown in FIG. 4 were used as the electrolyte salt.

The thus prepared gel electrolytes were subjected to evaluation tests for determining a fire retardant property thereof. The results of the evaluation tests are shown in Table 4.

TABLE 4

| Ex. No.[1] | ANM[2] (mol %) | EC[3] (mol %) | PC[4] (mol %) | Salt of Electrolyte | Burning Test |
|---|---|---|---|---|---|
| 31 | 20 | 60 | 20 | $LiPF_6$ | not burned |
| 32 | 20 | 60 | 20 | $LiClO_4$ | burned |
| 33 | 20 | 60 | 20 | $LiBF_4$ | burned |
| 34 | 20 | 60 | 20 | $LiCF_3SO_3$ | burned |
| 35 | 20 | 60 | 20 | $LiN(CF_3SO_2)_2$ | burned |

Note:
[1]: Experimental Example Number;
[2]: Acrylonitrile monomer;
[3]: Ethylene carbonate;
[4]: Propylene carbonate.

As shown in FIG. 4, only the gel electrolyte containing $LiPF_6$ as the electrolyte salt (Experimental Example 31) exhibited a good fire retardant property while the gel electrolytes containing other electrolyte salts was burned. This revealed that $LiPF_6$ was suitable as the electrolyte salt for the production of fire-retardant cells.

Next, the gel electrolytes were prepared in the same manner as described above except that the ratio of the acrylonitrile monomer: ethylene carbonate (EC): propylene carbonate (PC) was fixed to 20 mole %: 60 mole %: 20 mole %, and $LiPF_6$ was used in amounts (concentrations) as mentioned in Table 5 to obtain the gel electrolyte.

Figure 5:
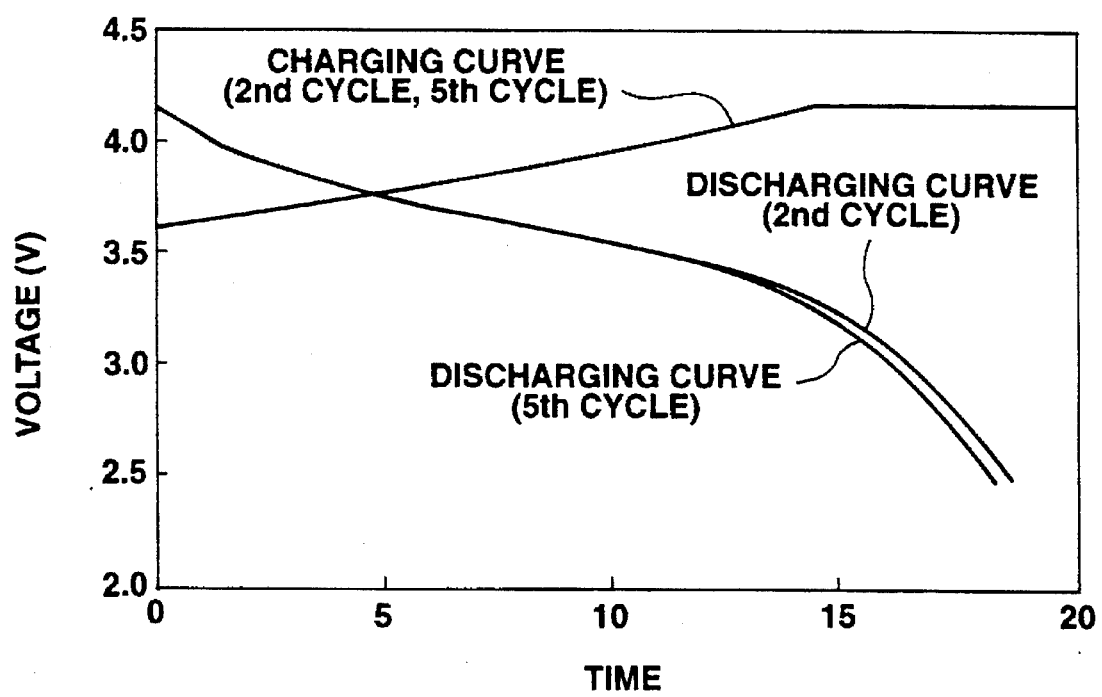
FIG. 5 is a graph showing a characteristic curve of a charging and discharging properties of a secondary cell to which the fire-retardant gel electrolyte according to the present invention is applied.

The thus prepared gel electrolytes were subjected to the measurement of ionic conductivities (σ1) at a temperature of 25° C. The gel electrolytes were also evaluated with respect to their fire retardant property. The results of the measurement and the evaluations are shown in FIG. 5.

TABLE 5

| Ex. No.[1] | ANM[2] (mol %) | EC[3] (mol %) | PC[4] (mol %) | Conc. of SE[5] | IC[6] (mS/cm) | Burning Test |
|---|---|---|---|---|---|---|
| 36 | 20 | 60 | 20 | 0.3 | 1.6 | not burned |
| 37 | 20 | 60 | 20 | 0.4 | 2.0 | not burned |

TABLE 5-continued

| Ex. No.[1] | ANM[2] (mol %) | EC[3] (mol %) | PC[4] (mol %) | Conc. of SE[5] | IC[6] (mS/cm) | Burning Test |
|---|---|---|---|---|---|---|
| 38 | 20 | 60 | 20 | 2.0 | 3.1 | not burned |
| 39 | 20 | 60 | 20 | 2.1 | 1.7 | not burned |

Note:
[1]: Experimental Example Number;
[2]: Acrylonitrile monomer;
[3]: Ethylene carbonate;
[4]: Propylene carbonate;
[5]: Molar concentration (M) of salt of electrolyte per 1 liter of the non-aqueous solvent (EC plus PC); and
[6]: Ionic conductivity σ1 measured at 25° C.

As is apparent from Table 5, when the concentration of $LiPF_6$ on the basis of the non-aqueous solvent was in the range of 0.4 to 2.0M, the gel electrolyte exhibited a relatively large ionic conductivity of 2.0 or greater. On the other hand, when the concentration of $LiPF_6$ on the basis of the non-aqueous solvent was out of the above-mentioned range, the gel electrolyte was less than 2.0. This revealed that a suitable concentration of $LiPF_6$ on the basis of the non-aqueous solvent was in the range of 0.4 to 2.0M.

Evaluation of Gel Electrolyte as an Electrolyte Material for Cells

Figure 3:
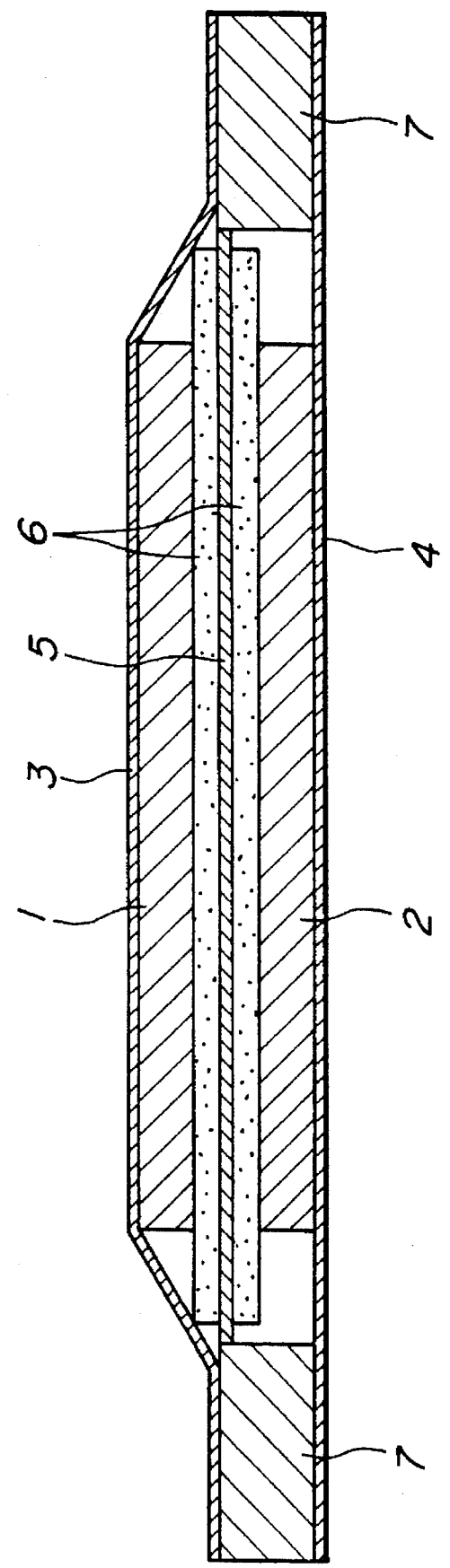
FIG. 3 is a sectional view of a cell according to one preferred embodiment of the present invention, to which a fire-retardant gel electrolyte according to the present invention is applied.

Primary and secondary cells were prepared by using the gel electrolytes as an electrolyte material to evaluate characteristics of the gel electrolyte. Meanwhile, the prepared primary and secondary cells both were of a thin-thickness type as shown in FIG. 3.

First, the thin-thickness type primary cell was prepared in the following manner.

85% by weight of manganese dioxide (positive electrode activating material), 10% by weight of graphite and 5% by weight of polyvinylidene-fluoride were blended with each other. The obtained mixture was further blended with dimethyl-formamide (DMF) as a solvent to prepare a positive electrode preparation. The resultant positive electrode preparation was coated on an aluminum thin film serving as a current collector of the cell. The coated aluminum thin film was dried at a temperature of 120° C. under a reduced pressure and then cut into a sheet piece having an surface area of 8 $cm^2$ to obtain an positive electrode 1.

A negative electrode 2 was prepared by cutting a metallic lithium plate having a thickness of 2 mm into a sheet piece having an surface area of 8 $cm^2$.

The thus produced positive and negative electrodes 1 and 2 were received in positive and negative sheathing members 3 and 4, respectively. The positive and negative sheathing members 3 and 4 were laminated in such manner that positive and negative electrodes 1 and 2 received therein were opposed to each other.

The gel electrolyte layer 8 was prepared in the following manner.

The gel solution was prepared from polyacrylonitrile, ethylene carbonate (EC), propylene carbonate (PC) and $LiPF_6$. The thus prepared gel solution was immediately stretched on one side surface of a separator film 5 and then cooled at room temperature to form a gel electrolyte layer 8 having a thickness of 120 μm thereon. A similar gel electrolyte layer 8 was also formed on the other side surface of the separator film 5. Incidentally, the ratio of the respective components in the gel solution was as follows. Namely, the gel solution contained 15 mole % of the acrylonitrile monomer, 57 mole % of ethylene carbonate (EC), 28 mole % of propylene carbonate (PC) and 0.8M of $LiPF_6$ (on the basis of a total amount of the non-aqueous solvent components). A non-woven fabric having a thickness of about 20 μm was employed as the separator film 5.

The separator film 5 on which the gel electrolyte layer 6 was coated was interposed between the laminated positive and negative electrodes 1 and 2. The positive and negative sheathing members 3 and 4 were heat-fused and sealed at outer peripheral flanges through a hot-melt adhesive material 7 to form the thin-thickness type primary cell.

The thus prepared primary cell was examined with respect to its discharging characteristics.

The discharge used for the above examination was a constant-current discharge, which was carried out at a current density of 200 $\mu A/cm^2$ and continued until a voltage of the closed circuit reached 1.8 volts. The measured discharging characteristic curve was illustrated in FIG. 4.

As understood from FIG. 4, an average voltage of the primary cell upon discharging was about 2.8 volts and the voltage curve exhibited a good flatness, by which it was recognized that the gel electrolyte employed were suitably used as an electrolyte material for primary cells.

Next, a thin-thickness type secondary cell was prepared in the following manner. Incidentally, the same procedure as described in the production of the primary cell above was repeated to prepare the secondary cell except that lithium cobaltate was used as the positive electrode activating material.

The thus prepared secondary cell was tested to determine charging and discharging characteristics thereof.

The charging and discharging tests were carried out as follows. Namely, a constant-current charge was carried out at a current density of 25 $\mu A/cm^2$ and continued until a voltage of the open circuit reached 4.2 volts, upon which the constant-current charge was changed over to a constant-voltage charge. The constant-voltage charge was continued until a total charging time reached 20 hours. Thereafter, a constant-current discharge was carried out at a current density of 200 $\mu A/cm^2$ until a voltage of the closed circuit reached 2.5 volts. The above-mentioned charging and discharging cycle was repeated several times. Charging and discharging characteristic curves for the second and fifth charging and discharging cycles are shown in FIG. 5.

As understood from FIG. 5, it was confirmed that charging and discharging efficiencies of the secondary cell were 90% or higher at both the second and fifth charging and discharging cycles. This revealed that the gel electrolyte is suitably and satisfactorily employed as an electrolyte material for secondary cells.

As mentioned above, the gel electrolyte according to the present invention exhibits a fire-retardant property and an ionic conductivity of 1 mS/cm or greater at a temperature of 25° C. so that the gel electrolyte can be used as an electrolyte material for cells.

By using such a gel electrolyte as an electrolyte material, a cell has an excellent safety due to its fire-retardant property, for instance, even when it is exposed to the flame. Further, the cell containing such a gel electrolyte does not cause any leakage of electrolyte even when handled roughly so that contamination of devices to which the cell is mounted can be effectively prevented.

What is claimed is:

1. A fire-retardant gel electrolyte comprising a gelled solution composed of a non-aqueous solvent and a salt of an electrolyte dissolved in said non-aqueous solvent, said gel electrolyte having an ionic conductivity of 1 mS/cm at a temperature of 25° C.

2. The fire-retardant gel electrolyte according to claim 1, wherein the gelation of a solution containing said non-aqueous solvent and said electrolyte salt dissolved in said non-aqueous solvent is carried out by adding a polymer having a side chain to which at least one nitrile group is bonded.

3. The fire-retardant gel electrolyte according to claim 2, wherein said polymer having a side chain to which at least one nitrile group is bonded is polyacrylonitrile.

4. The fire-retardant gel electrolyte according to claim 3, wherein said polymer having a side chain to which at least one nitrile group is bonded is polyacrylonitrile, and a ratio of said polyacrylonitrile in terms of an acrylonitrile monomer to said non-aqueous solvent is in the range of 5:95 to 30:70.

5. The fire-retardant gel electrolyte according to claim 1, wherein said non-aqueous solvent constituting said gelled solution contains at least one compound selected from the group consisting of ethylene carbonate, propylene carbonate, γ-butyl-lactone, methyl-ethyl carbonate and dimethyl carbonate.

6. The fire-retardant gel electrolyte according to claim 5, wherein said non-aqueous solvent constituting said gelled solution contains at least one compound selected from the group consisting of ethylene carbonate and propylene carbonate.

7. The fire-retardant gel electrolyte according to claim 6, wherein said polymer having a side chain to which at least one nitrile group is bonded is polyacrylonitrile, said non-aqueous solvent constituting said gelled solution is a mixture of ethylene carbonate and propylene carbonate, and a ratio of polyacrylonitrile in terms of the acrylonitrile monomer: ethylene carbonate: propylene carbonate is fallen within a region surrounded and defined by A site being the acrylonitrile monomer: 30 mol %, ethylene carbonate: 20 mol %, propylene carbonate: 50 mol %, B site being the acrylonitrile monomer: 5 mol %, ethylene carbonate: 20 mol %, propylene carbonate: 75 mol %, C site being the acrylonitrile monomer: 5 mol %, ethylene carbonate: 85 mol %, propylene carbonate: 10 mol % and D site being the acrylonitrile monomer: 30 mol %, ethylene carbonate: 60 mol %, propylene carbonate: 10 mol % of a ternary composition diagram.

8. The fire-retardant gel electrolyte according to claim 1, wherein said electrolyte salt of the gelled solution is $LiPF_6$ and $LiPF_6$ is contained in said gelled solution in an amount of 0.4 to 2 mole per one liter of said non-aqueous solvent.

9. A cell comprising:
   a fire-retardant gel electrolyte having an ionic conductivity of 1 mS/cm or greater at a temperature of 25° C.; and positive and negative electrodes.

10. The cell according to claim 9, wherein said positive electrode is made of a lithium-containing compound and said negative electrode is made of a material selected from the group consisting of metallic lithium, a lithium alloy and a carbonaceous material capable of occluding lithium.

11. The cell according to claim 10, wherein said lithium compound constituting said positive electrode is a composite oxide of lithium and a transition metal.

* * * * *

UNITED STATES PATENT AND TRADEMARK OFFICE
CERTIFICATE OF CORRECTION

PATENT NO. : 5,658,686
DATED : August 19, 1997
INVENTOR(S) : Hiroyuki Akashi

It is certified that error appears in the above-indentified patent and that said Letters Patent is hereby corrected as shown below:

At column 13, line 2, between "of" and "1", insert
--at least--.

Signed and Sealed this

Eleventh Day of August 1998

Attest:

BRUCE LEHMAN

Attesting Officer

Commissioner of Patents and Trademarks